United States Patent Office

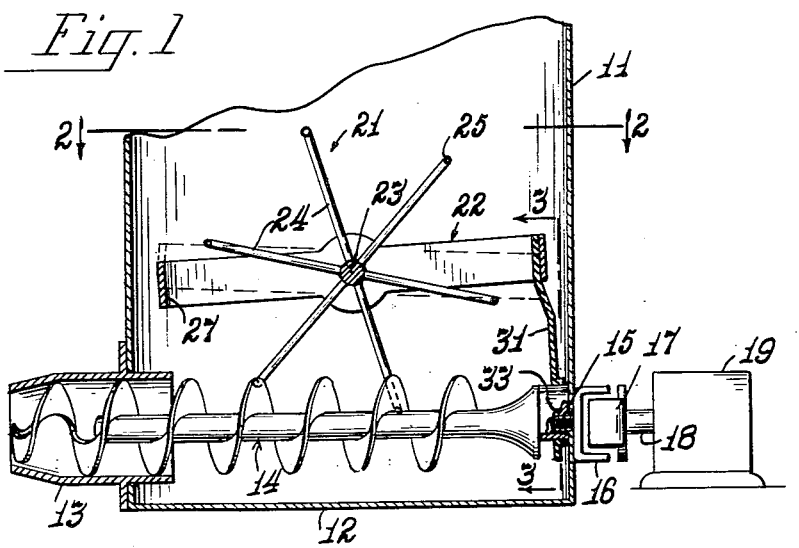
Fig. 1
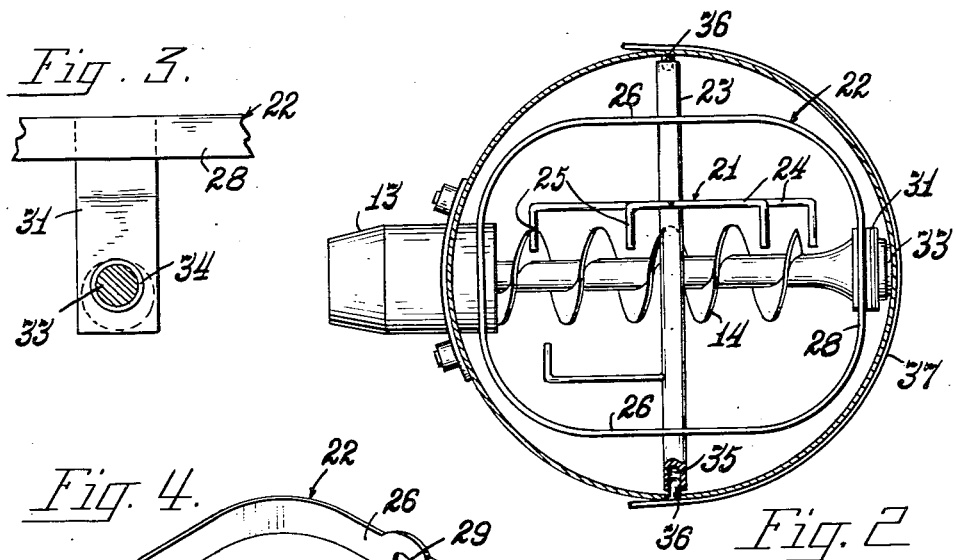
Fig. 3
Fig. 2
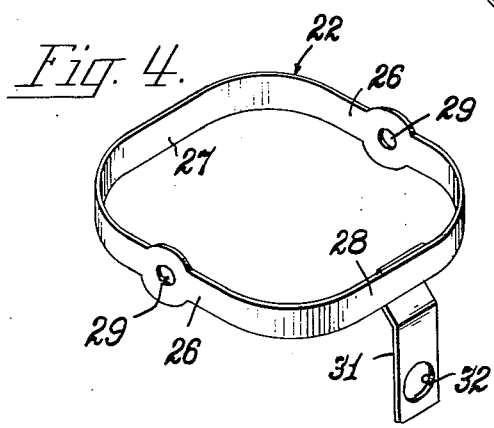
Fig. 4
INVENTOR.
GORDON VAN LEEUWEN

2,794,577
Patented June 4, 1957

2,794,577

DISPENSING APPARATUS AND AGITATOR THEREFOR

Gordon Van Leeuwen, Aurora, Ill., assignor to Stoner Mfg. Corp., Aurora, Ill., a corporation of Illinois Application March 29, 1956, Serial No. 574,763

8 Claims. (Cl. 222—227)

The invention relates to improvements in dispensing apparatus and more particularly to a dispensing container or canister for dry powdered material having novel means mounted therein to prevent packing or caking of the material so as to insure the dispensing of uniform quantities of the material during operation of dispensing mechanism therein contained.

The structure of the present invention is particularly intended for use in the dispensing of measured amounts of dry powdered material or beverage ingredients such as sugar, cocoa, powdered coffee, powdered soup, powdered cream and the like, during operation of a hot beverage dispensing machine. Such machines include a plurality of canisters each containing a specific ingredient. During machine operation, means is actuated to discharge a measured quantity of a selected ingredient or ingredients into a bowl or other mixing chamber into which is discharged a measured quantity of hot water. The resulting mix then is delivered to a cup or other container for removal by the operator. Should there be an insufficient amount of any required ingredient delivered to the mixing bowl, the resulting mix or beverage is unsatisfactory. This situation has occurred with the use of prior types of dispensing devices owing primarily to the tendency of the powdered ingredients to pack in the canister and thereby cause an insufficient quantity to be dispensed during operation of the dispensing means. This condition is particularly noticeable in connection with the vending of certain ingredients such as powdered soup and sugar which, although dry, are or become tacky and tend to become compacted by their own weight. When this occurs, the dispensing mechanism, which is in the form of an auger type conveyor located near the bottom of the canister, operates in a void.

The present structure is designed to operate within the mass of ingredient in a region above the vending auger so as to continuously move, during operation of the auger, in a multiple of directions to thereby stir or agitate any ingredient which has or is likely to become compacted. Such agitation insures that there is a plentiful supply of ingredient in the area within which the vending auger operates. It is therefore an object of the invention to provide novel means, within a vending canister for a dry powdered ingredient, for agitating the ingredient therein to insure that a uniform quantity of such ingredient is vended as required.

Another object is to provide, in association with an auger-type feeding device, a novelly constructed agitator mechanism.

Another object is to provide a vending canister with an agitator structure which can be removed easily for cleaning and quickly replaced.

Another object is to provide a one-piece agitator element that is not expensive to construct, is positive in its operation and highly efficient in use.

Another object is to provide a multiple-part agitator device, one portion of which advances on the path of a circle while the other portion thereof is rotatably and slideably reciprocal.

With the foregoing and other objects in view which will appear as the description proceeds, the invention consists of certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of constructoin, assembly and operation, and many of its advantages should be readily understood and appreciated.

Referring to the drawings in which the same characters or reference are employed to indicate corresponding or similar parts throughout the several figures of the drawings:

Figure 1 is a fragmentary longitudinal vertical sectional view through the lower portion of a dry ingredient canister showing the features of the present invention.

Figure 2 is a horizontal sectional plan view taken substantially on line 2—2 of Figure 1.

Figure 3 is a fragmentary detail sectional view taken on line 3—3 of Figure 1.

Figure 4 is a perspective view of the improved agitating element.

Referring to the accompanying drawings, the agitator is constructed to be mounted within a substantially cylindrical canister 11 having a bottom wall 12 and a dispensing spout 13 in its side wall closely adjacent to the bottom wall. A dispensing device comprising an auger-type dispenser 14 is suitably journaled at one of its ends within the spout 13 and it extends diametrically across the canister interior and has a shaft extension 15 of reduced dimensions threaded into its other end and journaled in and extending through the canister wall. The outwardly projecting end of the shaft extension 15 carries a suitable coupling element 16 having an operative engagement with a complemental coupling element 17 on the end of a shaft 18 of a drive motor 19.

The canister 11 is adapted to be filled with a dry powdered ingredient which is adapted to be vended through the spout 13 in measured quantities during operation of the auger 14. In practice, the motor 19 is intermittently energized for short periods of time determined by the quantity of ingredients it is desired to vend during each operation. It has been found that when an auger-type dispensing mechanism operates in a body of dry ingredients, said auger tends to create a void within the body of the material owing primarily to the tendency of such material to become compacted by its own weight within the lower portion of the canister. When this situation occurs there is an insufficient quantity of ingredients vended and in many instances no ingredients are vended. In order to avoid such occurrence, novel means is provided within the canister 11 for operation within the body of the dry ingredients for agitating the latter and thereby breaking up any compactness which might occur and thus insure that there is a sufficient quantity of the ingredient within the operating region of the auger for delivery of the required amount each time the auger is operated.

The means provided for agitating the dry ingredients includes a rotatable type agitator element 21 and an oscillating type agitator element 22, both of which are mounted on a rotatable shaft 23 bridging the interior of the canister above the auger 14 and perpendicular thereto. The rotatable agitator element or wheel 21 preferably consists of a plurality of fingers 24 formed of stiff wire stock which project radially from the shaft 23 and are integral therewith and which have their free end portions bent in a common direction substantially at right angles to the radial portions thereof, as at 25, for the purpose of providing means whereby the agitator 21 may be operatively engaged by the helixes of the auger and rotated thereby. The bent end portions 25 of the radial fingers 24 also serve to bite into the mass of ingredients for loosening the same.

The agitator element 22, which is best illustrated in Figure 4, is formed from stiff strap material such as stainless steel into a substantially rectangular loop with rounded corners having substantially parallel side walls 26 and connecting end walls 27 and 28. The side walls 26 having aligning bearing apertures 29 located substantially midway between the end walls 27 and 28, which apertures have a free rotatable and sliding fit on the shaft 23. The end wall 28 of the agitator element 22 has a depending arm 31 integral therewith formed adjacent its lower end with a large circular opening 32. When the agitator element 22 is mounted on the shaft 23, as is best shown in Figure 1, the circular opening 32 is fitted over an eccentric 33 provided on the auger 14 adjacent the shaft extension 15 thereof. If desired an anti-friction ring 34 may be mounted on the eccentric 33.

Although the shaft 23 may be pivotally mounted within the canister in any suitable manner, it is preferred that it be mounted so as to be easily and quickly removed therefrom. In order to accomplish this, it is preferred to provide a detent 35 in each end of the shaft 23 for engagement by journals 36 one carried on each free end of a resiliently yieldable clamp strip 37 arranged on the outside of the canister with the journals 36 extending through openings in the canister wall. In order to remove the shaft 23 it is only necessary to cam the free ends of the clamp 37 outwardly a distance sufficient to disengage the journals 36 from the recesses 35. The entire agitator assembly may then be removed from the canister following removal of the shaft portion 15 of the auger 14 to permit disengagement of the arm 31 from the eccentric 33.

In operation, the motor 19 is energized to rotate the auger 14 in a direction to propel ingredients within the area of the helixes thereof in the direction of and through the vending spout 13. During auger rotation, the end portions 25 of successive radial fingers 24 are engaged by the proximate helixes so as to rotate the shaft 23 and fingers 24 in a clockwise direction. At the same time, the eccentric 33 functions to oscillatably rotate the agitator loop 22 about the shaft 23, as indicated in dotted lines in Figure 1, and also to oscillatably slide said agitator loop 22 longitudinally on the shaft 23. This multiple direction movement of the agitator loop 22, combined with the rotating motion of the radial fingers 24, functions to insure breaking up of ingredients which might have become compacted in the lower portion of the canister 11 above the auger 14. As a result, the ingredients within the canister 11 are maintained in a sufficiently loose state at all times to insure the vending of the desired quantity of such ingredients through the vending spout 13.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. In a dispenser for dry ingredients in powdered form including a rotatable auger operable within a canister to deliver the ingredients through a vending opening in said canister, a shaft journaled at its ends in said canister and arranged above and at right angles to the axis of said auger, an agitating wheel on said shaft engageable with the auger helixes so as to be rotated during rotation of the auger, an agitator loop mounted for free rotation and longitudinal shifting on said shaft, and means including an eccentric on the auger engageable with means on the loop operable to oscillatably rotate said loop in a vertical plane and shift it longitudinally along said shaft.

2. In a dispenser for dry ingredients in powdered form including a rotatable auger operable within a canister to deliver the ingredients through a vending opening in said canister, a shaft journaled at its ends in said canister and arranged above and at right angles to the axis of said auger, an agitating wheel on said shaft engageable with the auger helixes so as to be rotated during rotation of the auger, an agitator element mounted for free rotation and longitudinal shifting on said shaft, and means including an eccentric on the auger engageable with means on the element operable to oscillatably rotate said element in a vertical plane and shift it longitudinally along said shaft.

3. A dispenser for dry powdered ingredients comprising a vertically arranged canister having a vending passage at its lower end, an auger journaled in said canister to feed the ingredients through said passage, a shaft journaled in the canister above said auger with its axis at right angles to the auger axis, an agitator element slidably and rotatably mounted on said shaft, an eccentric on said auger, and means on the agitator element engageable with the eccentric, said agitator element having oscillating rotation about said shaft and being oscillatably slidable therealong during operation of the auger.

4. An agitating device adapted to be mounted within a dry powdered ingredient canister, said device comprising a shaft within said canister, a substantially rectangular loop loosely journaled on said shaft midway between its end walls, an arm integral with one end wall and extending perpendicular to the plane of said loop, an eccentric operatively engaged with the end portion of said arm, and means to rotate the eccentric so as to oscillatably rotate the loop about the shaft and to oscillatably reciprocate the loop longitudinally along said shaft.

5. An agitator device comprising a shaft, a strap formed into a substantially rectangular loop journaled loosely on said shaft midway between the end walls of said loop and an arm on and perpendicular to the plane of the loop, an eccentric operably engaged with said arm, said eccentric being operable to oscillatably rotate the loop about the shaft and to oscillatably shift it along said shaft.

6. An agitator device of the character recited in claim 5 in which the arm has an opening adjacent its free end within which the eccentric operates.

7. An agitator device comprising a substantially rectangular loop including substantially parallel side walls and substantially parallel end walls connecting said side walls, transversely aligned bearing journals in said side walls midway between the end walls, a shaft extending through said bearing journals, an arm on one of said end walls extending perpendicular to the plane of the loop, and a power operated eccentric operably engaged with said arm providing an operative connection between the loop and said eccentric for operation of the agitator.

8. An agitator device comprising a substantially rectangular loop including substantially parallel side walls and substantially parallel end walls connecting said side walls, means pivotally mounting the loop midway between its ends for reciprocal rotation on and longitudinal shifting along the axis of said pivot means, and means operable to move said loop, said operable means including an eccentric and an arm on said loop engageable with the eccentric.

References Cited in the file of this patent

UNITED STATES PATENTS

| | | |
|---|---|---|
| 647,769 | Strawbridge | Apr. 17, 1900 |
| 999,295 | Blue | Aug. 1, 1911 |
| 1,620,280 | Newton | Mar. 8, 1927 |
| 2,005,681 | Norquist | June 18, 1935 |
| 2,368,127 | Fasick | Jan. 30, 1945 |
| 2,687,244 | Peterson | Aug. 24, 1954 |